F. N. TILTON.
SCREW SLOTTING MACHINE.
APPLICATION FILED MAY 18, 1907.

913,585.

Patented Feb. 23, 1909.
7 SHEETS—SHEET 1.

Fig. 1.

Witnesses.
U. U. Williams.
Lena C. Berry.

Inventor.
Fred N. Tilton, by
Harry P. Williams
atty.

F. N. TILTON.
SCREW SLOTTING MACHINE.
APPLICATION FILED MAY 18, 1907.

913,585.

Patented Feb. 23, 1909.
7 SHEETS—SHEET 3.

Witnesses.

Inventor.

F. N. TILTON.
SCREW SLOTTING MACHINE.
APPLICATION FILED MAY 18, 1907.

913,585.

Patented Feb. 23, 1909.
7 SHEETS—SHEET 5.

Witnesses.
H. L. Williams.
Lena E. Berry.

Inventor.
Fred N. Tilton,
Harry P. Williams
atty.

F. N. TILTON.
SCREW SLOTTING MACHINE.
APPLICATION FILED MAY 18, 1907.

913,585.

Patented Feb. 23, 1909.

Witnesses.

Inventor.

UNITED STATES PATENT OFFICE.

FRED N. TILTON, OF HARTFORD, CONNECTICUT.

SCREW-SLOTTING MACHINE.

No. 913,585.

Specification of Letters Patent.

Patented Feb. 23, 1909.

Application filed May 18, 1907. Serial No. 374,484.

*To all whom it may concern:*

Be it known that I, FRED N. TILTON, a citizen of the United States, residing at Hartford, in the county of Hartford and State of Connecticut, have invented a new and useful Screw-Slotting Machine, of which the following is a specification.

This invention relates to a machine for sawing slots in the heads of blanks for screws, and while it is particularly designed for slotting wood screw blanks, it is equally applicable for slotting machine screw blanks and the like pieces.

The object of the invention is to provide a simple machine which can be used for slotting a large number of blanks of the same or various sizes requiring the same or different cuts, and which is so constructed that any or all of the various sections may be used at will and without danger of the parts becoming damaged or broken as a result of the clogging or irregular feed of the blanks of any section or the non-use of any section.

The machine illustrated as embodying the invention has four hoppers into any or all of which the blanks are thrown promiscuously. These blanks are raised by rotary elevators to inclined troughs down which they slide to oscillatory mechanisms which transfer them to horizontal positions between dies which, after the transfers move back out of the way, are closed so as to clamp the blanks with their heads in the paths of rotatory saws, which then are advanced simultaneously and cut the slots. After the slots are formed the saws are moved back and the dies opened and the blanks permitted to drop from the machine and other blanks to be placed in positions to be slotted.

Figure 1:
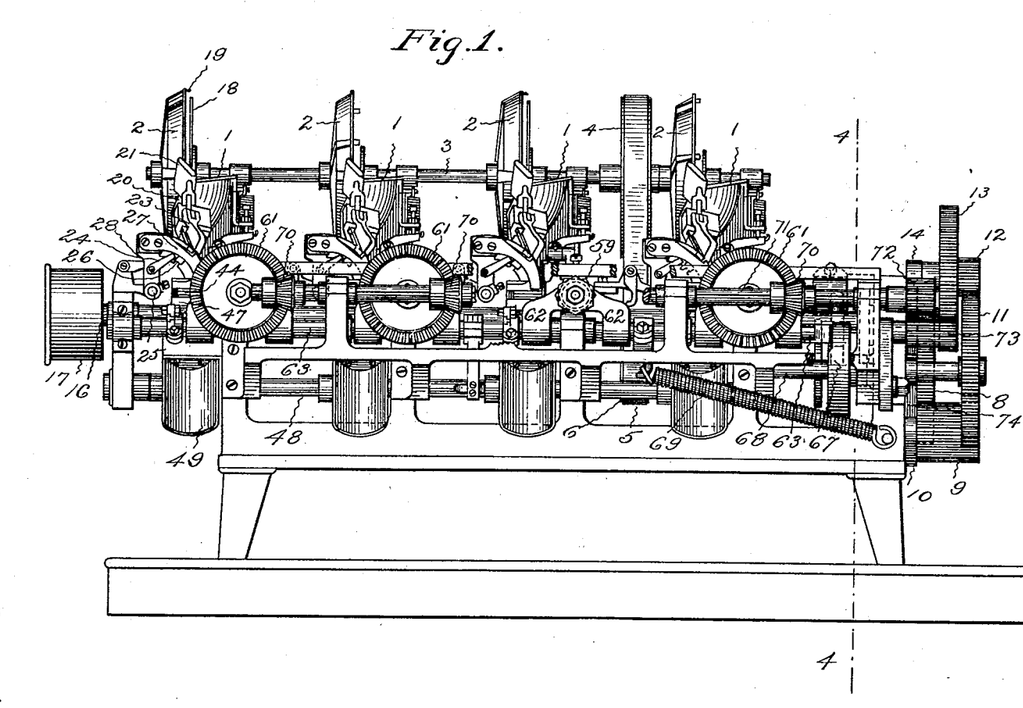
Figure 1 of the accompanying drawings shows a front elevation of the machine with some of the parts broken away so as to better show the construction.
Figure 3:
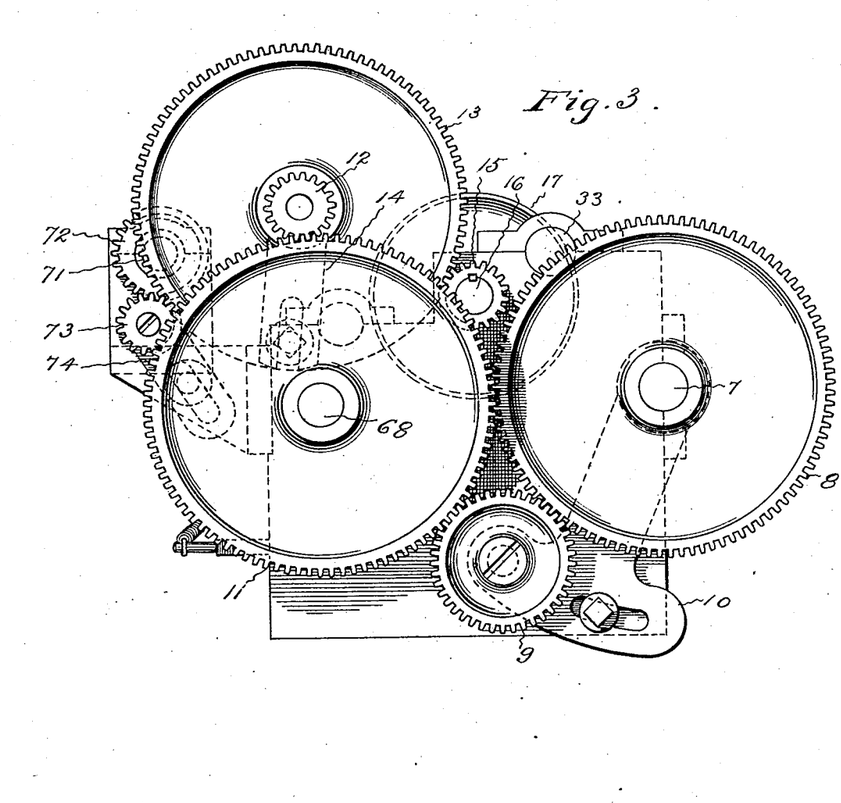
Fig. 3 shows an elevation of the right end of the machine.
Figure 4:
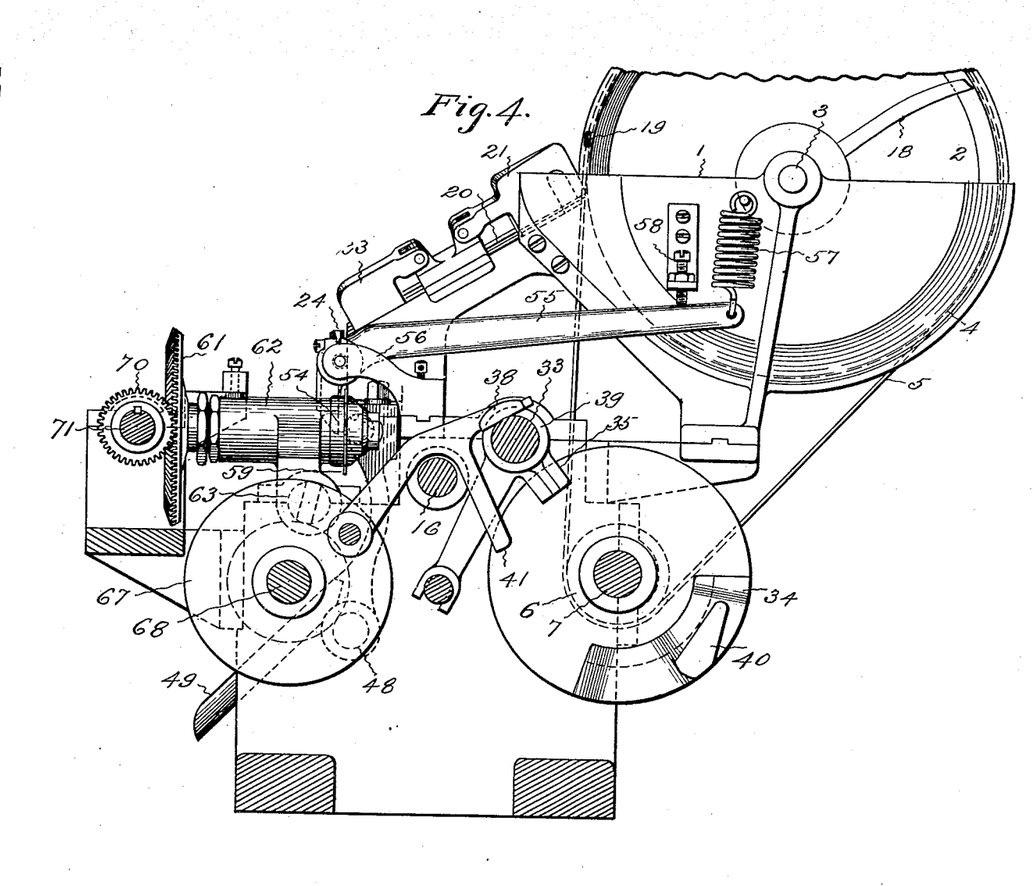
Fig. 4 shows a sectional elevation of the right end of the machine taken on the plane indicated by the line 4—4 on Fig. 1.

In the machine illustrated there are four fixed semi-cylindrical hoppers 1, but the machine may have fewer or more hoppers without departing from the invention. Coöperating with and turning in proximity to an open side of each hopper is a rotatory cylindrical elevator 2. These elevators are mounted on a shaft 3 that extends from end to end above the back side of the machine and that has a pulley 4 that is connected by a belt 5 with a pulley 6 on the shaft 7 (Figs. 1, 4). This shaft at the right end of the machine has a gear 8 that meshes with a pinion 9 which is carried by the swinging bracket 10 and which meshes with a gear 11 in mesh with a pinion 12 attached to the gear 13 mounted on an adjustable bracket 14 and meshing with a pinion 15 on the driving shaft 16 which extends the length of the machine and at the left end has a driving pulley 17 which is adapted to be belted to any convenient source of power (Fig. 3).

Figure 2:
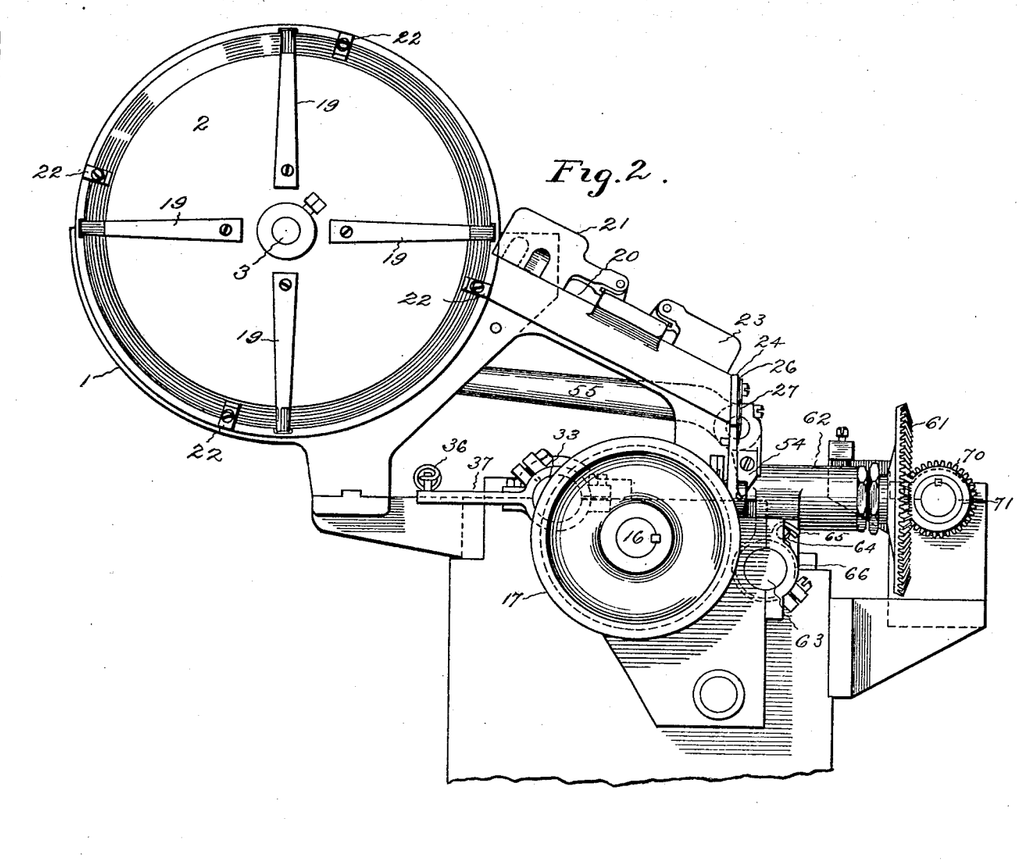
Fig. 2 shows on larger scale an elevation of the left end of the machine.
Figures 5, 6:
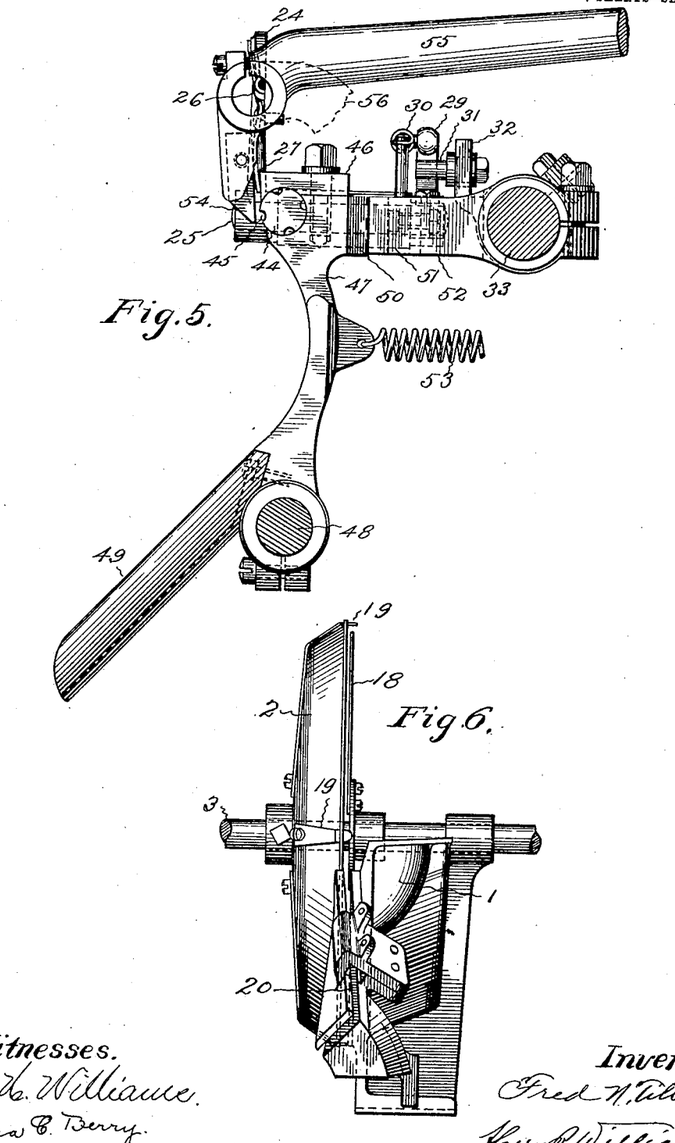
Fig. 5 shows a side view of a front die and its support and a swinging back-rest with a back-die and a discharge trough.
Fig. 6 shows a front view of a hopper, elevator and feed trough.

Fastened to and turning with the elevator shaft so as to pass down into each hopper is an arm 18 which during its revolution enters the mass of blanks in the hopper and agitates them so that they will tend to drop with their shanks projecting downwardly in a narrow opening between the hopper and the elevator. Fingers 19 are fastened to the back of each elevator in such manner that their front ends project through the rim of the elevator and tend to catch the blanks and move them so that they will rise up and pass into the trough 20 down which the blanks slide by gravity. (Figs. 2, 4, 6).

A gate 21 is pivoted to each trough so that its head will extend across the upper end of the trough near the outlet from the hopper and periphery of the elevator. Blocks 22 are fastened to the back near the periphery of each elevator so that they will, as they come around with the elevator, engage and lift the latch allowing it to drop down and thus tend to keep the blanks in proper position in the trough and also allow the escape of any blanks which might collect at the outlet from the hopper in such position that they would not slide down the trough. (Figs. 2, 4). Pivoted to each trough there also is a gate 23 that has its free end lying over the lower end of the trough. This latch is adapted to hold the heads of the blanks down so they will be in proper position to be taken by the transfer mechanism.

Figures 7, 9:
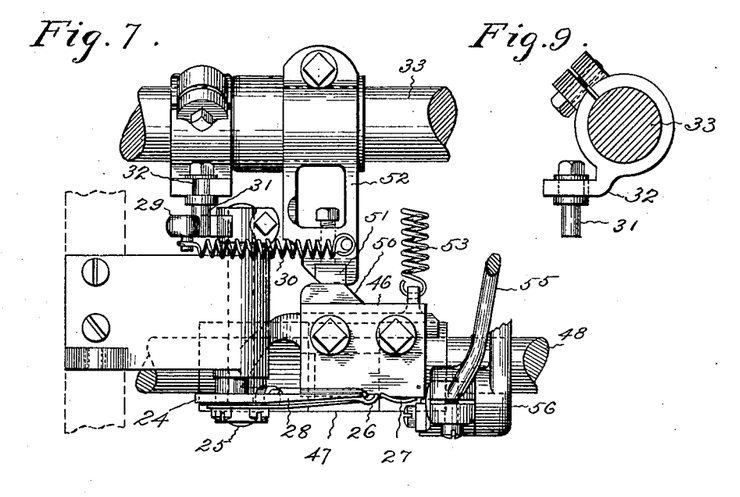
Fig. 7 shows a plan of a front die holder, a back-rest, the wedge which moves the back-rest forwardly, a transfer and the mechanism which oscillates the transfer.
Fig. 9 is a detail view of a part of the transfer oscillating mechanism.
Figures 8, 10:
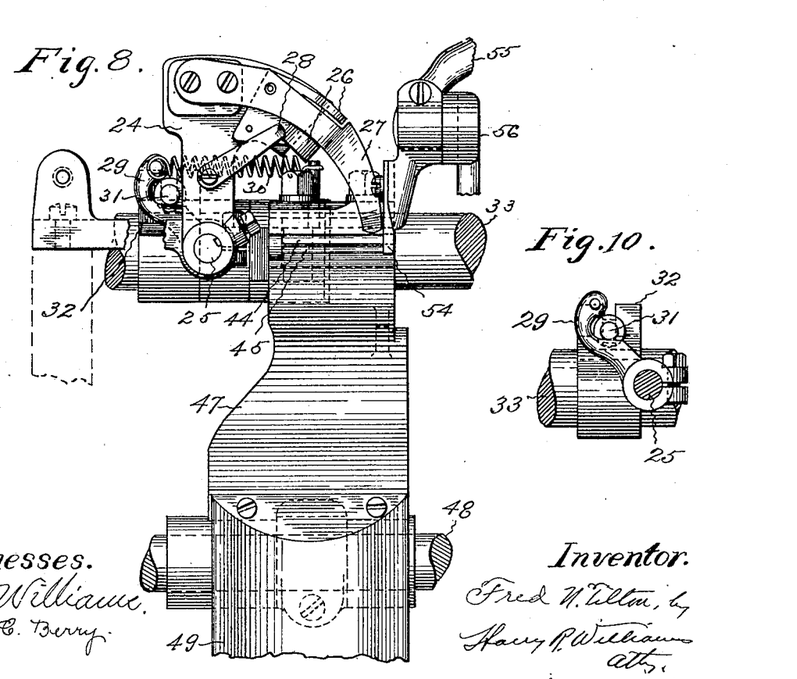
Fig. 8 shows a front elevation of the parts shown in Fig. 7.
Fig. 10 is a detail view of a part of the transfer oscillating mechanism.

Each transfer mechanism consists of a plate 24 attached to a rock-shaft 25 and provided with holding fingers 26 and a retaining arm 27. The fingers are yieldingly attached to the plate and are held in position by a spring 28 (Figs. 7, 8). Each transfer plate is adjustably connected to its shaft so that its position may be accurately determined and this shaft which is supported by a fixed part of the frame on its rear end has a hooked arm 29. A spring 30 is connected with this arm in such a manner as to tend to pull it over and the transfer fingers down. (Figs. 7, 8).

Arranged to engage with the hooked arm on the rear end of the transfer shaft and push it over and the transfer fingers up is a stud 31 that is adjustably fastened to an arm 32 that is adjustably clamped on the reciprocatory bar 33 that extends the length of the machine. (Figs. 7, 8, 9, 10). This bar is moved in one direction at the proper time by the cam 34 on the shaft 7, that engages with the lug 35 that is adjustably clamped to the bar (Fig. 4). The bar is drawn in the opposite direction by a spring 36 that is connected with an arm 37 which projects from the bar at the left end of the machine (Fig. 2). A latch 38 is pivoted to the frame at the right end of the machine so as to drop down into the path of the collar 39 of the lug 35 and hold the bar against being drawn by its spring. The cam 40 connected with the cam 34 on the shaft 7, at the proper time engages the horn 41 (Fig. 4) and lifts this latch so that the spring may draw the bar and move the stud from in front of the hook 29 (Figs. 2, 4, 7) and allow the spring 30 to oscillate the transfer mechanism downwardly.

When the transfer mechanisms are in their upper positions the fingers stand in front of the lower ends of the troughs in position to receive the lowest of the headed blanks in the troughs. As these transfers are oscillated downwardly by their springs when the latch 38 is lifted and the bar 33 is drawn by its spring, the blanks are carried down to horizontal positions between the front and back dies. When the transfers move downwardly the backs of the plates close the lower ends of the troughs and prevent the succeeding blanks from dropping out. Subsequently the cam 34 engages the lug 35 and positively moves back the bar 33 and causes the studs 31 to engage the hooked arms 29 and rock the transfers upwardly until the fingers are again at the lower ends of the troughs. When the bar is back the latch 38 drops into place and holds the bar until the latch is again lifted.

Figure 14:
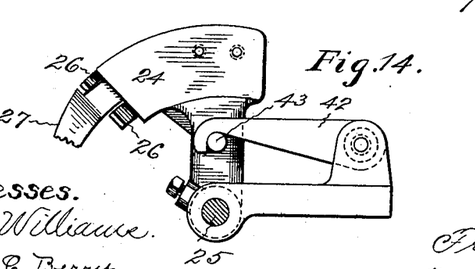
Fig. 14 is a detail rear elevation of an oscillating transfer and the means for holding it out of commission.

A hook 42 is pivoted to the frame and arranged to engage a stud 43 projecting from the back of each transfer plate, so that any or all of the transfers can be held from feeding blanks when desired. (Fig. 14). Each transfer plate is adjustably fastened to its rock-shaft so its position can be accurately determined, and each hooked arm is adjustably connected with its rock-shaft and each stud that engages a hooked arm is adjustable up and down in its arm which is adjustable along and around the bar, so the exact amount of movement and position of dwell of the transfer fingers will be insured. The back dies shown are cylindrical blocks 44 with blank holding recesses 45. These dies are adjustably secured by plates 46 in recesses in frames 47 that are adjustably fastened to a rock-shaft 48 which is loosely supported by the end frames of the machine. A discharge chute 49 is fastened to each oscillatory back frame. (Figs. 5, 8).

On the rear of each back die frame is a wedge 50 and arranged to engage each frame wedge is a wedge 51 adjustably mounted in the block 52 that is adjustably clamped to the reciprocatory bar 33. When the bar is forced toward the left by its cam the wedges engage and force the die frame and back die forwardly, and when the bar is drawn to the right by its spring the die frame and back die are pulled back by the spring 53 (Figs. 5, 7). The wedges that move forwardly each back die frame are adjustable in and out and along the bar so the exact amount of movement will be imparted to the back dies. After the oscillatory transfers have moved downwardly and deposited blanks in the back die grooves and while the transfer fingers are moving upwardly the blanks are held in the die grooves by the spring holding arms 27. After the transfer fingers are up out of the way the back dies are moved forwardly until the blanks are clamped between the back dies and the front dies 54.

Each front die is fastened to the front lower end of an angle lever 55 that is pivoted to a bracket 56. (Figs. 5, 8). Connected with the rear end of each front die lever is a stiff spring 57 that is aranged to hold the front die firmly and yet permit the front die to yield, so that the parts will not become broken in case a blank should fail to be located properly between the dies. A stop screw 58 is arranged on the side of each hopper to accurately determine the position of the lever and front die (Fig. 4).

Figures 11, 13:
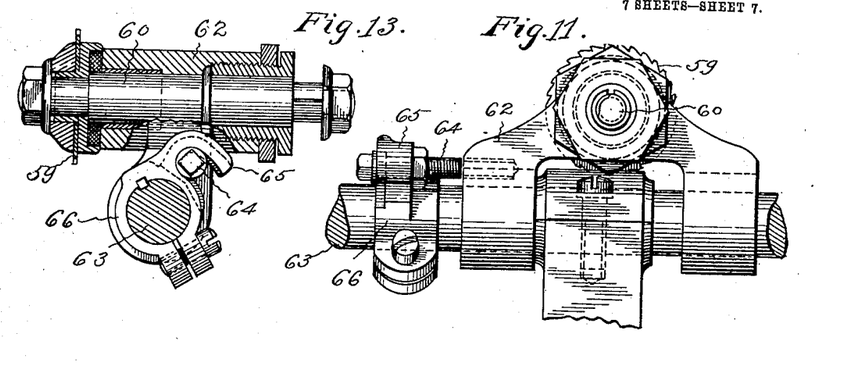
Fig. 11 is a front elevation of a saw and a saw frame.
Fig. 13 is a sectional view through a saw and saw frame.

When the blanks are properly located and firmly held by the dies their heads are in the path of movement of the slotting saws 59 which are in number equal to the hoppers, feeds, transfers and dies. Each of these saws is clamped to the rear end of an arbor 60, to the front end of which a beveled gear 61 is clamped. Each spindle is properly mounted in bearings in a frame 62 that is movably mounted on the reciprocatory bar 63. A screw 64 carried by an arm 65 extending from a collar 66, that is adjustably clamped to the bar 63, is designed to connect the saw frame with the bar so as to obtain the exact adjustment of the frame on the bar and consequently determine the exact amount of cut of the saw. (See Figs. 11, 12, 13).

Figure 12:
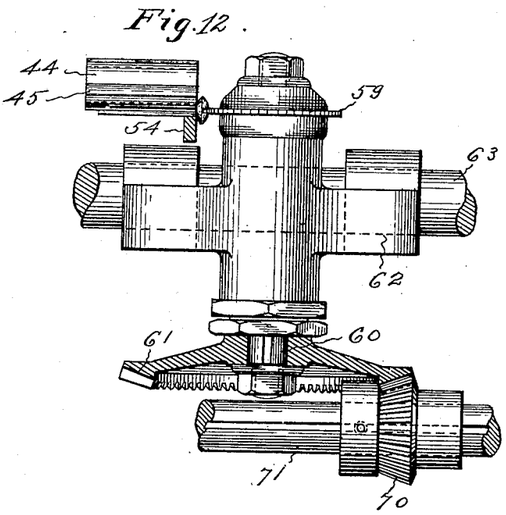
Fig. 12 is a plan of a saw and saw frame and the dies holding a blank.

The bar 63 carrying the saw supporting frames is moved for feeding the saws up to their work by a cam 67 on the shaft 68 which is supported by bearings in the frame near the right end of the machine and has the gear 11. (Figs. 1, 4). The bar with the saw frames is pulled in the opposite direction by a spring 69. (Fig. 1). By this means the saws are reciprocated to their work positively and drawn backwardly by means of the spring. Meshing with each saw spindle gear 61 is a bevel pinion 70 that is splined to the shaft 71 which extends longitudinally along the front of the machine. At the right end of the machine on this shaft is a gear 72 that meshes with a pinion 73 which is mounted on an adjustable bracket 74 clamped to the end of the frame. The pinion 73 also meshes with the intermediate gear 13 that meshes with the driving pinion 15 on the main driving shaft 16. (Fig. 3). The rotation of these gears causes the revolution of the saws and as the saws move back and forth the beveled pinions 70 are moved back and forth along the shaft 71 by the gears 61. (Fig. 12). After the saws have been drawn away from the blanks the back die frames are drawn back releasing the slotted blanks so they can drop out from the dies into the chutes and discharge from the machine.

The adjustable brackets which support the intermediate and idle gears and pinions allow the sizes of these parts to be changed so as to vary the speed of the machine for different classes of work. All of the parts are adjustable so that blanks of different sizes may be slotted and the holding and actuating parts while firm, are arranged so that they will yield in case any blank fails to be set in proper position. Any, or all, of the hoppers may be used at one time, and blanks of the same size or blanks of different sizes may be placed in the several hoppers and fed through the machine, the parts being independently adjustable to permit the proper action of the feeding and holding mechanisms and of the cutting saws for blanks of various sizes.

The invention claimed is:

1. A slotting machine having a plural number of blank holders arranged longitudinally of the machine, a saw frame support extending longitudinally of the machine past all of the holders, a saw frame mounted on the common support opposite each blank holder, a saw arbor held by each frame, a saw mounted on each arbor, a single driving shaft for rotating all of the saw arbors simultaneously and means for varying the distance between the saws and blank holders, substantially as specified.

2. A slotting machine having a plural number of blank holders arranged longitudinally of the machine, a saw frame support extending longitudinally of the machine past all of the holders, a saw frame mounted on the common support opposite each blank holder, a saw arbor held by each frame, a single driving shaft for rotating all of the saw arbors simultaneously, and a mechanism for reciprocating the saw frames simultaneously, substantially as specified.

3. A slotting machine having a plural number of feed mechanisms, means for independently adjusting the feed mechanisms for different sizes of blanks, mechanism for operating the feed mechanisms simultaneously, a plural number of holding mechanisms, means for independently adjusting the holding mechanisms for different sizes of blanks, mechanism for operating the holding mechanisms simultaneously, a plural number of saws, a common saw support, means for independently adjusting the saws on said support in the direction of the feed and toward and from the holders, mechanism for rotating the saws simultaneously, and mechanism for reciprocating the saws simultaneously, substantially as specified.

4. A slotting machine having a plural number of feed mechanisms operated from a common source, a plural number of holding mechanisms operated from a common source, a plural number of saws, said saws being mounted in independent frames, mechanism for revolving the saws simultaneously, a common support for the saw frames, and mechanism for reciprocating the saw frame support, substantially as specified.

5. A slotting machine having a plural number of feed mechanisms operated from a common source, a plural number of holding mechanisms operated from a common source, a plural number of shafts, a saw and a gear mounted on each shaft, a common mechanism for reciprocating each shaft, saw and gear, a driving shaft, means for rotating the driving shaft, and pinions loosely mounted on the driving shaft and meshing with the gears on the saw shafts, substantially as specified.

6. A slotting machine having a plural number of feed mechanisms operated from a common source, a plural number of holding mechanisms operated from a common source, a plural number of saws, an independent saw frame supporting each saw, a common support for the saw frames, mechanism for reciprocating the common saw frame support, an independent gear for rotating each saw, an independent pinion for rotating each saw-gear, a shaft common to all of the pinions, and mechanism for rotating the shaft, substantially as specified.

7. A slotting machine having a plural number of oscillatory mechanisms that are opened for receiving and closed for holding blanks, independent means for oscillating each holding mechanism, a common support for said oscillating means, and mechanism for reciprocating the common support, substantially as specified.

8. A slotting machine having a plural number of hoppers for receiving blanks, a plural number of feed troughs leading from the hoppers for conducting blanks, a plural number of independent transfer mechanisms for carrying blanks from the troughs to holders, independent means for actuating the transfer mechanisms, a common support for the actuating means, mechanism for reciprocating said common support, a plural number of holders operated from a common source for receiving blanks from the transfer mechanisms, a plural number of tools for operating on the blanks in the holders and mechanism for operating the tools and moving them toward and from the holders, substantially as specified.

9. A slotting machine having a plural number of independent hoppers for receiving blanks, means for removing blanks from said hoppers, a plural number of feed troughs for receiving blanks from said means, a common mechanism for operating said means, a plural number of transfer mechanisms for taking blanks from the troughs, a common mechanism for actuating the transfer mechanisms, a plural number of holders for receiving blanks from the transfer mechanisms, mechanism for operating the holders, a plural number of tools for operating on the blanks in the holders, and mechanism for operating the tools and moving them toward and from the holders, substantially as specified.

10. A slotting machine having a plural number of hoppers for receiving blanks, means for removing blanks from the hoppers, a common mechanism for operating said means, a plural number of feed troughs for receiving blanks from said means, a plural number of independent transfer mechanisms for taking blanks from the troughs, a plural number of holders for receiving blanks from the transfer mechanisms, a common mechanism for actuating the transfer mechanisms and the holders, a plural number of tools, and mechanism for moving the tools toward and from the holders, substantially as specified.

11. A slotting machine having a plural number of hoppers for receiving blanks, means for removing blanks from the hoppers, a common mechanism for operating said means simultaneously, a plural number of feed troughs for receiving blanks from said means, a plural number of independent transfer mechanisms for taking blanks from the troughs, a common mechanism for oscillating the transfer mechanisms simultaneously, a plural number of holding mechanisms for receiving blanks from the transfer mechanisms, a common mechanism for actuating the holding mechanisms simultaneously, a plural number of independent tools, a common mechanism for moving the tools to their work simultaneously, and a common mechanism for rotating the tools simultaneously, substantially as specified.

12. In a slotting machine having feeding and holding mechanisms, a plural number of independently supported shafts, a saw and rotating means on each shaft, a common mechanism for rotating the said shafts, and mechanism for moving the independent saw shafts simultaneously toward and from the holding mechanisms, substantially as specified.

13. A slotting machine having a feed mechanism, means for actuating the feed mechanism, an oscillatory transfer mechanism for receiving blanks from the feed mechanism, means for oscillating the transfer mechanism, a fixed die for receiving blanks from the transfer mechanism, a holder adapted to be oscillated toward and from the die and with the die hold the blanks, means for oscillating the holder, a reciprocating saw frame, means for reciprocating the saw frame, a saw carried by the frame, and means for rotating the saw, substantially as specified.

FRED N. TILTON.

Witnesses:
HARRY R. WILLIAMS,
LENA C. BERRY.